Aug. 3, 1943.　　　F. J. HAUSCHILD　　　2,325,953
VEHICLE WHEEL
Filed April 17, 1942　　　2 Sheets-Sheet 1
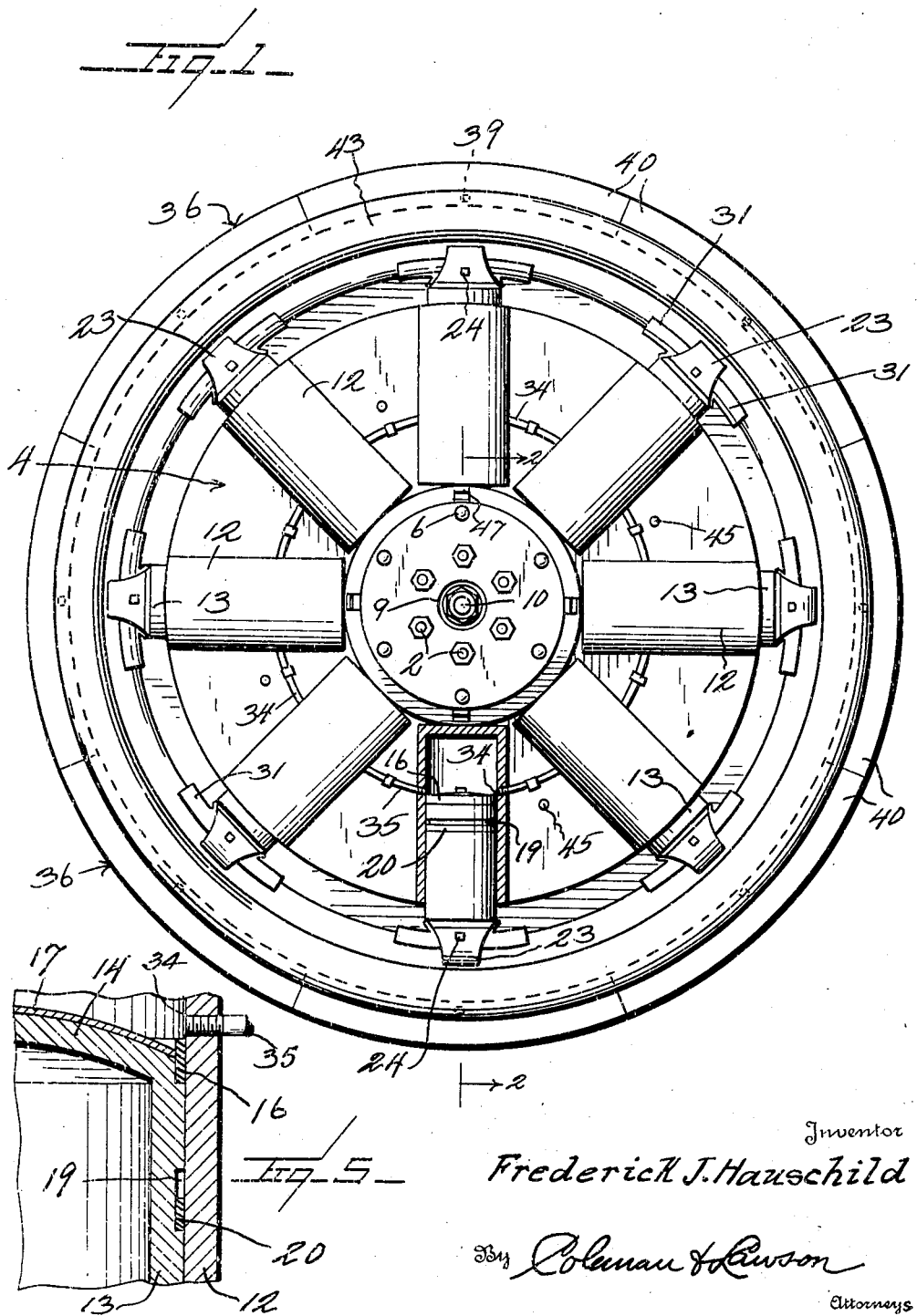
Inventor
Frederick J. Hauschild
By Coleman & Lawson
Attorneys

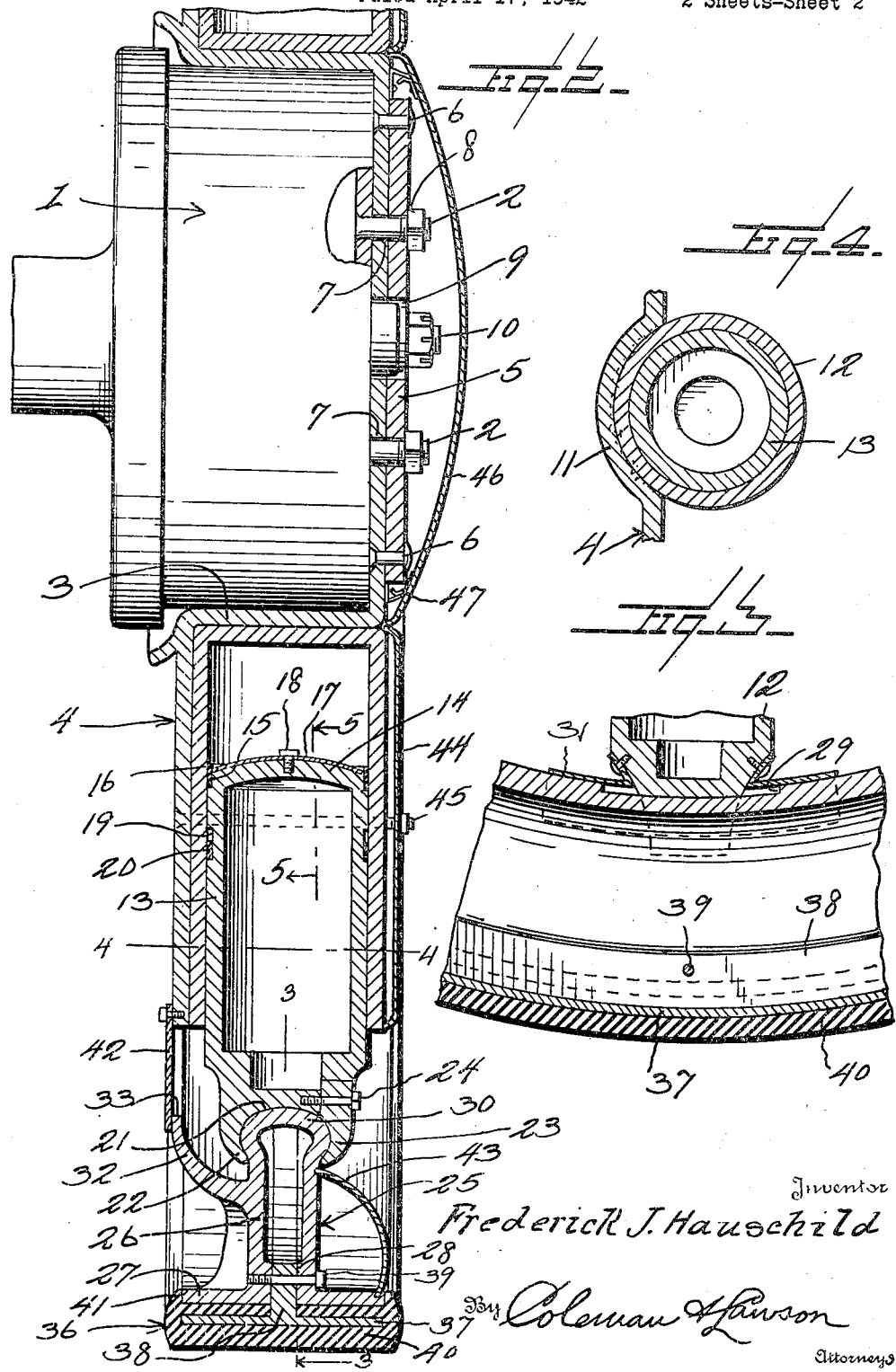

Patented Aug. 3, 1943

2,325,953

UNITED STATES PATENT OFFICE 2,325,953

VEHICLE WHEEL

Frederick J. Hauschild, Oneonta, N. Y.

Application April 17, 1942, Serial No. 439,417

8 Claims. (Cl. 152—55)

This invention relates generally to the class of wheels, and pertains particularly to an improved vehicle wheel designed to supplant the present pneumatic tire carrying wheel.

The principal object of the present invention is to provide an improved pneumatic type of wheel wherein the sustaining air pressure is enclosed within a series of cylinders disposed radially about the axial center of the wheel, and the wheel tread has movement relative to said cylinders through the medium of pistons operatively coupled with the tread and extended into the cylinders, the weight sustained by the wheel being transmitted through the compressed air in the lowermost cylinders to the pistons and the ground engaging tread or rim.

Another object of the invention is to provide an improved pneumatic wheel of the type above described, wherein the cylinders are initially filled with air under a predetermined pressure and wherein the cylinders are all connected together so that the air pressure will be equalized or balanced between them at all times during the operation of the wheel.

Still another object of the invention is to provide a pneumatic wheel of the general construction above set forth, wherein the connecting conduits between the cylinders are so arranged that those conduits of the lowermost cylinders will be shut off by a slight inward movement of the pistons therein during the operation of the wheel, whereby the lowermost pistons will be sustained upon a cushion of compressed air.

Still another object of the invention is to provide a pneumatic wheel of the character described, wherein a novel rim structure is provided and novel means is employed for coupling the rim structure with the pistons, whereby a slight or limited turning of the rim structure with respect to the cylinders and pistons is permitted to facilitate the necessary relative up and down movement of the rim and cylinders during the rotation of the wheel.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings.

Figure 1 is a view, partly in side elevation and partly in section, of a wheel constructed in accordance with the present invention, the hub cap and cover plate for the outer side of the wheel being removed.

Figure 2 is a sectional view taken substantially on the line 2—2 of Figure 1.

Figure 3 is a sectional view on the line 3—3 of Figure 2.

Figure 4 is a transverse section on the line 4—4 of Figure 2.

Figure 5 is a fragmentary section on the line 5—5 of Figure 2.

Referring now more particularly to the drawings, the numeral 1 designates, in Figure 2, a vehicle wheel brake drum to which the wheel structure is secured in the customary manner through the medium of the stud bolts 2 which are integrally connected with the outer side of the drum.

The wheel structure of the present invention comprises a hub 3 which is in the form of a drum and which is designed to snugly receive the brake drum, as shown in Figure 2, this wheel drum being integrally formed with an inner plate of circular design, indicated generally by the numeral 4.

The wheel drum has secured to its outer side the reinforcing plate 5, through the medium of the pins 6 and this plate and the outer wall of the wheel drum are provided with openings 7 through which the stud bolts 2 extend to receive upon their outer ends the nuts 8 by which the wheel is maintained in position. At the center of the outer wall of the wheel drum or hub 3 and the reinforcing plate 5 is an opening 9 through which the wheel axle 10 projects.

The circular plate 4 is provided with a plurality of channels or cradles 11 in each of which is secured, in a suitable manner, a piston cylinder 12. This is one method of securing the cylinders to the wheel plate but, if desired, the plate and cylinders may be formed or cast as a single unit and the cylinders later reamed out to the desired inside diameter. As shown in Figures 1 and 2 the outer ends of the cylinders which are open, terminate flush with the periphery of the plate 4.

Within each of the cylinders is a piston 13, the inner end of which has the convex or domed head 14 around the periphery of which is formed a suitable channel or recess 15 for the reception of a packing ring 16 which bears against the wall of the cylinder. The top of the head has disposed thereon a resilient metallic disk 17 which is drawn down tightly by the screw 18 so that the periphery of the disk holds the packing ring 16 firmly in position against the wall of the cylinder.

Inwardly of the packing ring 16 the cylinder is provided with the encircling channel 19 in which is located the packing ring 20. These packing rings are preferably of leather and each cylinder will be supplied with a suitable quantity of lubricant oil which, due to the domed construction of the cylinder head, will tend, as each piston comes around to its lowermost vertical position, to flow to the walls of the cylinder, and thus keep the rings constantly lubricated and soft. Any oil which works down between the wall of the cylinder and the piston will be picked up in the raking channel 19 and absorbed by the leather ring 20 therein. In this manner an airtight contact between each piston and its cylinder will be maintained at all times so that the proper air cushion will be provided for the piston.

At its outer end each piston is provided with a transversely extending slightly arcuate channel 21, the length of each channel and its slight curvature substantially corresponding to the curvature of the adjacent rim structure. Each of these channels is also transversely arcuate, as is clearly shown in Figure 2, the circumferential arc being best shown in Figure 3. At the inner side of each channel 21 there is formed the slightly curved jaw 22 which is integral with the piston body, while upon the outer side of the channel is a removable jaw 23 which is detachably secured to the piston by the screw bolt 24.

As shown in Figure 2, the jaws 22 and 23 coact to form the complete channel which, as previously stated, is of arcuate cross-section and is of greatest width at the bottom or inwardly from the mouth of the channel which is defined by the edges of the jaws.

The numeral 25 generally designates the rim of the wheel which comprises the hollow annular web 26 which is formed integrally with the tread band 27. Through the band 27 and opening into the hollow web is the annular slot 28, the purpose of which will be hereinafter described.

The inner edge of the rim web 26 is machined down to form a short circumferentially extending recess 29 and the transversely arcuate head portion 30 which is shaped transversely to snugly fit in the channel 21 and to be gripped lightly between the jaws 22 and 23. By this means the pistons are coupled at their outer ends with the rim so that any movement of the rim relative to the cylinders must be accompanied by a corresponding movement of the pistons and also the pistons and the rim can have slight relative circumferential movement, thus preventing binding of the parts when the in and out movement of the pistons in the cylinders occurs.

In order to prevent the entrance of dust and dirt into the recesses 29 and between the heads 30 and the surfaces of the channels, each piston has secured to its outer end the transversely and longitudinally arcuate saddle-like shield 31 which rests upon and straddles the inner edge of the rim, thus covering the adjacent recess, as clearly shown in Figure 3.

Integral with the inner side of the rim web is the upwardly and inwardly extending flange 32, the edge 33 of which is in the plane of the plate 4 and thus would be contacted by the edge of the plate in the event that all of the air escapes from the cylinder, to prevent the movement of the cylinders downwardly beyond a desirable position.

Each of the cylinders 12 is provided with two air ports 34 which are located at points inwardly from the outer ends of the cylinders so as to be just uncovered by the inner ends of the pistons when all pistons are in the same position with respect to the center of the wheel, as shown in Figure 1. These ports of each cylinder are connected each with a port of an adjacent cylinder by a pipe 35 and, consequently, the air which is charged into the cylinders under a selected initial pressure, can move or shift from cylinder to cylinder as the wheel rotates under a load. Due to the relative positions of the ports 34 and the inner ends of the pistons it will be seen that only a slight inward movement of a piston is necessary to immediately close the ports so that the air will then be trapped in the inner end of the cylinder and will form a cushion against which the piston presses.

The wheel tread is indicated as a whole by the numeral 36 and this is made up of a series of shoes each comprising a short arcuate plate 37 having a central longitudinal rib 38 which engages in the slot 28 of the wheel rim and is secured therein by the bolts 39, as shown in Figure 2.

Each shoe plate 37 is covered with a body of rubber 40 which, along each longitudinal edge, is extended upwardly slightly to form the side lip 41 which overlaps the adjacent edge of the band 27, as is best illustrated in Figure 2. These tread shoes when secured in position are in end abutting relation, as shown in Figure 1, so that there is provided a continuous tread surface around the rim band 27.

In order to prevent the entrance of dirt between the flange 32 and the rim and piston an annular shield plate 42 is secured to the rear of the plate 4 and overlaps the flange 32, as shown in Figure 2.

The numeral 43 designates a shield or cover of arcuate cross-section which engages at its edges in recesses formed in the inner surface of the band 27 and the forward or outer side face of the web 26. This forms an arcuate finishing body across the angle between the web and the band and hides the bolts or screws 39 which secure the shoes to the rim.

The numeral 44 designates a second cover plate upon the outer side of the wheel, the outer peripheral edge of which engages the cylinders while the inner peripheral edge engages across the inner ends of the cylinders and this cover plate is maintained in position by stud bolts 45 which are secured to the back plate 4 and extend forwardly through the cover in the manner illustrated in Figure 2. The cover plate 44 is of annular form and has the diameter of the central opening substantially equal to the diameter of the wheel drum 3, and this central opening of the cover plate 44 is filled by the hub cap 46 which is secured to the wheel drum in any suitable manner as, for example, by the use of the interconnecting spring fingers 47 such as are commonly employed for securing hub caps to wheels.

In operation, the chambers at the inner ends of the pistons are filled with air under a desired pressure, this pressure being equalized through the conduits 35, between the several cylinders.

When a load is applied to the wheel there will be relative movement between that portion of the wheel which is secured to the brake drum 1, namely the wheel drum 3, plate 4 and cylinders 12, and the movable portion of the wheel comprising the rim 25, tread structure 36, and the pistons 13 which are coupled with the rim. Such relative movement will cause the lowermost vertical piston, shown with its cylinder in longitudinal section in Figure 1, to move upwardly in the cylinder, thereby shutting off the escape of air from the upper end of the cylinder through the adjacent conduit 35 and establishing a cushion for the piston. Some slight inward movement will also be given to the pistons upon opposite sides of the lowermost one, such inward movement also being accompanied by a slight sliding movement between the outer ends of the said adjacent pistons and the rim. The horizontally disposed pistons will slide up on the rim and be shifted outwardly slightly while the uppermost three pistons will all shift outwardly with respect to their cylinders. Such sliding movement of the pistons and the cylinders will be continuous during the rotation of the wheel and it will be readily apparent that the vehicle which the wheel carries will be sustained by the air cushions formed at the inner ends of the cylinders as the latter move down below the horiozntal center of the wheel.

I claim:

1. A wheel construction of the character described comprising a plate body having a central hub adapted to be mounted upon a supporting axle, a plurality of cylinders carried by said plate radially with respect to the hub, said cylinders being closed at their inner ends, air conduits connecting the inner ends of the cylinders together, a piston within each cylinder, a rim encircling and connecting with the outer ends of the pistons, said rim having a circumferentially extending outwardly opening channel, the connection between the pistons and the rim being so constructed and arranged as to allow limited turning movement of the rim with respect to the pistons on the axis of the wheel, and a tread encircling the rim and comprising a series of individual shoes each having a rib upon its inner side which is detachably secured in the channel of the rim.

2. A wheel structure as set forth in claim 1, in which each of said shoes comprises a plate with which the rib is integrally formed and a rubber covering body over the outer face of the plate and extending across and inwardly with respect to the side edges thereof.

3. A wheel structure as set forth in claim 1, including an annular flange formed integral with the inner side of the rim and curving inwardly toward the center of the wheel and having its inner edge in spaced relation with the peripheral edge of the cylinder carrying plate, and an annular shield plate secured to the cylinder carrying plate and extending across the space between the last named plate and said flange.

4. A pneumatic wheel comprising a central portion including a plurality of cylinders disposed radially about the axial center of the wheel and means for mounting the wheel on and for rotation about an axle, and an outer portion comprising an annular rim encircling and extending across the outer ends of the cylinders, a plurality of pistons each connected at one end with said rim and slidably extending into a cylinder, a ground engaging tread carried by the rim, air conduits connecting said cylinders together and opening into the cylinders immediately adjacent the inner ends of the pistons when all of the pistons are at equal distances from the axial center of the wheel, each of said pistons being formed at its outer end to provide a pair of opposing jaws, and said rim having a series of spaced recesses each formed to provide a transversely arcuate head slidably held between a pair of piston jaws.

5. A pneumatic wheel comprising a central portion including a plurality of cylinders disposed radially about the axial center of the wheel and means for mounting the wheel on and for rotation about an axle, and an outer portion comprising an annular rim encircling and extending across the outer ends of the cylinders, a plurality of pistons each connected at one end with said rim and slidably extending into a cylinder, a ground engaging tread carried by the rim, air conduits connecting said cylinders together and opening into the cylinders immediately adjacent the inner ends of the pistons when all of the pistons are at equal distances from the axial center of the wheel, said rim having a transversely rounded inner edge and said rounded edge having the surface formed with a series of spaced circumferentially extending short recesses, means for connecting the outer end of each piston with the recessed portion of the rim whereby sliding movement may occur between the said outer end of each piston and the bottom of the recess of the rim within the limits of the recessed portion.

6. A pneumatic wheel comprising a central portion including a plurality of cylinders disposed radially about the axial center of the wheel and means for mounting the wheel on and for rotation about an axle, and an outer portion comprising an annular rim encircling and extending across the outer ends of the cylinders, a plurality of pistons each connected at one end with said rim and slidably extending into a cylinder, a ground engaging tread carried by the rim, air conduits connecting said cylinders together and opening into the cylinders immediately adjacent the inner ends of the pistons when all of the pistons are at equal distances from the axial center of the wheel, said rim having its inner edge provided with a series of spaced short recesses extending circumferentially of the rim, means coupling the outer end of each piston with a recessed portion of the rim whereby sliding movement of the piston on the rim within the limits of the recess is permitted, and said tread comprising a plurality of shoe elements detachably coupled in end to end relation with said rim.

7. A cushion wheel comprising a hub portion, a plurality of piston cylinders secured to and extending radially from said hub and disposed equidistantly thereabout, each of said cylinders being open at its outer end, a piston in each cylinder, a fluid passing conduit connecting said cylinders together at points adjacent the inner ends of the pistons when all of the pistons are equidistantly spaced from the center of the hub at a predetermined position with respect to said center, a rim encircling the pistons and having a central inwardly extending web having a transversely rounded free inner edge, said web having a series of short circumferentially extending recesses in the surface of the rounded edge, each recess being in radial alinement with a piston, means operatively coupling the outer end of each piston with the recessed area of the web adjacent thereto comprising an integral inner jaw member engaging across the inner side of the recessed area, and an outer jaw member which is detachably coupled with the piston and disposed to engage in the recess upon the outer side of the web, said jaws coacting to inclose the adjacent recessed portion of the web for limited sliding movement in the recess, and a tread carried by and encircling the outside of the rim.

8. A cushion wheel construction as set forth in claim 7, in which said rim has a circumferentially outwardly opening slot, and said tread comprises a plurality of units having a central inwardly extending rib removably engaged in said slot, with means for securing the ribs in the slot.

FREDERICK J. HAUSCHILD.